(12) United States Patent
Fickerl et al.

(10) Patent No.: US 12,503,169 B2
(45) Date of Patent: Dec. 23, 2025

(54) METHOD FOR PRODUCING A VEHICLE STRUCTURAL COMPONENT, MORE PARTICULARLY A BODY STRUCTURAL COMPONENT OF A VEHICLE

(71) Applicant: Bayerische Motoren Werke Aktiengesellschaft, Munich (DE)

(72) Inventors: Alexander Fickerl, Munich (DE); Thiemo Fieger, Olching (DE); Felix Haeckel, Munich (DE); Johannes Staeves, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 420 days.

(21) Appl. No.: 17/925,137

(22) PCT Filed: Apr. 20, 2021

(86) PCT No.: PCT/EP2021/060190
§ 371 (c)(1),
(2) Date: Nov. 14, 2022

(87) PCT Pub. No.: WO2021/228511
PCT Pub. Date: Nov. 18, 2021

(65) Prior Publication Data
US 2023/0182825 A1 Jun. 15, 2023

(30) Foreign Application Priority Data
May 15, 2020 (DE) .......................... 10 2020 113 250

(51) Int. Cl.
*B62D 25/00* (2006.01)
*B23K 26/342* (2014.01)
(Continued)

(52) U.S. Cl.
CPC ............ *B62D 25/00* (2013.01); *B23K 26/342* (2015.10); *B29C 70/68* (2013.01); *B33Y 80/00* (2014.12);
(Continued)

(58) Field of Classification Search
CPC ............ B23K 26/342; B23K 2101/006; B23K 10/027; B22F 10/25; B22F 10/28; B33Y 80/00; B29C 70/68
(Continued)

(56) References Cited

U.S. PATENT DOCUMENTS 5,896,643 A 4/1999 Tanaka
6,703,579 B1 3/2004 Rice
(Continued)

FOREIGN PATENT DOCUMENTS

CN 106696248 A 5/2017
CN 208246057 U * 12/2018
(Continued)

OTHER PUBLICATIONS

CN208246057 Text (Year: 2018).*
(Continued)

*Primary Examiner* — Dennis H Pedder
(74) *Attorney, Agent, or Firm* — Crowell & Moring LLP

(57) ABSTRACT

A method for producing a vehicle structural component includes providing a first component body and a second component body and additively building up a connecting body. The first component body and the second component body are connected by the connecting body during the additively building up of the connecting body at least in a portion to form the vehicle structural component.

12 Claims, 2 Drawing Sheets

(51) Int. Cl.
  *B29C 70/68* (2006.01)
  *B33Y 80/00* (2015.01)
  *B62D 25/08* (2006.01)
  *B23K 101/00* (2006.01)

(52) U.S. Cl.
  CPC ........ *B62D 25/08* (2013.01); *B23K 2101/006* (2018.08)

(58) Field of Classification Search
  USPC .................................................... 296/187.01
  See application file for complete search history.

(56) References Cited

U.S. PATENT DOCUMENTS

| | | |
|---|---|---|
| 10,493,705 B2 | 12/2019 | Kia et al. |
| 2017/0050677 A1 | 2/2017 | Czinger et al. |

FOREIGN PATENT DOCUMENTS

| | | | |
|---|---|---|---|
| CN | 109290570 A | 2/2019 | |
| CN | 109292025 A | 2/2019 | |
| CN | 109941358 A | 6/2019 | |
| CN | 110712687 A | 1/2020 | |
| DE | 10 2012 011 217 A1 | 12/2013 | |
| DE | 102015102908 A1 * | 9/2016 | ............ B21D 22/02 |
| DE | 10 2016 121 007 A1 | 5/2017 | |
| DE | 10 2018 203 647 A1 | 9/2019 | |
| EP | 3 135 566 A1 | 3/2017 | |
| WO | WO 2016/044876 A1 | 3/2016 | |
| WO | WO 2018/145912 A1 | 8/2018 | |

OTHER PUBLICATIONS

DE102015102908 Text (Year: 2016).*
PCT/EP2021/060190, International Search Report dated Jul. 1, 2021 (Two (2) pages).
German Search Report issued in German application No. 10 2020 113 250.6 dated Feb. 15, 2021, with Statement of Relevancy (Seven (7) pages).
English-language Chinese Office Action issued in Chinese application No. 202180024930.9 dated Apr. 13, 2023 (Ten (10) pages).

* cited by examiner

METHOD FOR PRODUCING A VEHICLE STRUCTURAL COMPONENT, MORE PARTICULARLY A BODY STRUCTURAL COMPONENT OF A VEHICLE

BACKGROUND AND SUMMARY OF THE INVENTION

The invention relates to a method for producing a vehicle structural component, in particular a body structural component of a vehicle.

Corresponding methods for producing a vehicle structural component, in particular a body component of a vehicle, are fundamentally known from the prior art. Thus, it is conventional to produce components of a body of a vehicle in the course of a forming process, e.g., in the course of an extrusion process and/or in a punching process. The individual components are then connected at connecting points via force-fitting and/or form-fitting connections. For example, the components are connected by means of screwed, riveted and/or welded connections. In this respect, the components are assembled as far as possible without a gap and/or so as to form small gap dimensions and connected to one another by a connecting means (e.g., a screw or a rivet) and/or by means of a welding process.

The invention is based on the object of specifying a method which, in particular in terms of an easy and quick and also automated measure, improves the quality of the vehicle structural components to be produced, in particular the body components of a vehicle, and allows production that is as far as possible largely automated.

The invention relates to a method for producing a vehicle structural component, in particular a body structural component of a vehicle, comprising the following method steps: a) providing at least one first and at least one further component body and b) additively building up at least one connecting body in the course of an additive production process, for example, the connecting body can be built up in the course of a build-up welding process. The method is distinguished in that the at least two component bodies are connected by the at least one connecting body, wherein this connecting operation results from or is effected during the at least partial, preferably complete, additive building-up of the connecting body to form the vehicle structural component, in particular the body structural component. As a result of the fact that the component bodies are connected by means of an additively built-up connecting body and the component bodies are connected at least in certain portions, in particular completely, during the building-up or during the additive production process for forming the connecting body, it is possible to produce a vehicle structural component, in particular a body structural component, easily and in an automated way. The vehicle structural component may also be referred to as hybrid component, since two prefabricated component bodies are connected to one another as a result of the building-up process of the connecting body and the connecting body itself forms a portion of the vehicle structural component to be fabricated.

The additive building-up of the connecting body makes it possible, for example, both to connect the component bodies and to implement a functionally advantageous geometry between the component bodies. It is thus possible to build up topology-optimized weld lines and/or weld seams, for example, by means of a 3D-printing robot, in the form of connecting bodies. The topology and/or the geometric shape of the connecting body can be optimized, for example, with respect to a force flow during intended use of the vehicle structural component, in particular the body structural component. The additively produced connecting body may, for example, also be used to bridge a gap between the component bodies and/or to compensate lengths of at least one component body.

The production of a hybrid component of this type makes it possible, for example, to merge and/or reproduce the incorporation of a multiplicity of functions in one vehicle structural component, in particular in a body structural component. Thus, for example, it is possible to incorporate a chassis component, such as a chassis link, with an electric motor housing; in the process, the first component body can form the chassis component at least in certain portions and the further component body can form the electric motor housing at least in certain portions, wherein the additively built-up connecting body forms at least a sub-portion of the chassis component or of the electric motor housing and connects the two component bodies to one another.

It is possible for the at least one connecting body, at least in certain portions, in particular completely, to be built around the first and/or at least one further (prefabricated) component body or surround it in the final state. In this respect, the connecting body may surround the first and/or further component body in such a way that the component body surrounded by the connecting body cannot pass through any opening portion of the connecting body. In other words, at least one component body can be captured, at least in certain portions, in a cavity formed by the connecting body. The cavity of the connecting body may be delimited by a further component body at least in certain portions, with the result that the cavity in which at least one first component body is arranged or formed is surrounded or enclosed by an assembly formed from at least one connecting body and at least one further component body.

It is possible for the vehicle structural component, at least in certain portions, in particular completely, to be in the form of at least one constituent part of a body, preferably in the form of a body structural component, and/or a chassis and/or a drive. The vehicle structural component, in particular the body structural component, may have, for example, a maximum longitudinal extent of greater than 1.00 meters, preferably of greater than 1.50 meters, particularly preferably of greater than 2.00 meters, most preferably of greater than 3.00 meters. In this respect, the apparatus for additively building up the connecting body between the at least two component bodies must have a correspondingly large and/or adaptable construction space, with the result that it becomes possible to receive a correspondingly large assembly for producing the vehicle structural component. The vehicle structural component, in particular the body structural component, at least in certain portions, in particular completely, may be in the form of a bulkhead and/or a passenger compartment and/or a luggage compartment and/or a vehicle pillar, preferably an A-pillar and/or B-pillar and/or C-pillar and/or D-pillar. It is also possible for the vehicle structural component, for example, to form or comprise at least one constituent part of an engine bearer and/or a spring support and/or a longitudinal member and/or a cowl and/or a front axle bearer and/or a rear axle bearer and/or an electric motor housing and/or a bearer or a housing of an electrical energy store and/or a sill and/or a seat bearer, in particular a seat crossmember, and/or a floor panel and/or a torsion ring and/or a rear longitudinal member and/or a rear flap and/or a spring-strut support. As an alternative or in addition, the vehicle structural component may fully form or comprise at least one of the components mentioned above.

It is possible that a functional structure is formed and/or has been formed or can be formed in or on the at least one connecting body. In particular, the functional structure, at least in certain portions, in particular completely, is built up or formed in the course of the additive building-up of the connecting body. The additive building-up method for forming the connecting body creates a high degree of design-related and manufacturing-related freedom in terms of the design or shaping of the connecting body. For example, it is possible to form or build up cavities and/or undercuts and/or any desired geometric shapes easily and conveniently. In this way, it is possible to form a functional portion, in the form of a cavity and/or an elevation, on the connecting body easily and economically. It is also optionally possible for the connecting body to protrude or be built up into a recess and/or into a volume of main extent of at least one component body, with the result that, by virtue of a corresponding configuration of this portion, protruding into the recess or into the volume of main extent of at least one component body, of the connecting body, a functional portion is optionally built up at these locations and/or can be formed or is formed as a continuation of the component body.

The functional structure, for example, at least in certain portions, in particular completely, may be in the form of a portion designed to guide a medium and/or an interface for securing and/or for receiving an attachment body. Preferably, the functional structure and the medium guidable therein is used as heat exchanger. In this respect, it is possible, for example, at least in certain portions, for a wall portion of the heat-exchanger-side functional structure that can guide the medium to interact with a further channel guiding a further medium, with the result that it is possible to transport heat energy between the first medium and the further medium via this wall and/or via a partial volume of the connecting body.

The medium-guiding portion of the connecting body may have, for example, a structure which is at least partially, in particular completely, media-tight, with the result that the medium can be virtually, in particular completely, captively guided or transported in the media-tight structure during operation as intended. In particular, the structure may be in the form of a media-tight channel. In the course of the additive building-up of the connecting body, the functional structure of the connecting body itself may be entirely finished or exhibit the properties provided for use as intended. As an alternative to this, it may optionally be provided that the functional structure has an intermediate state, in particular an intermediate state which does not exhibit the properties of the functional structure that are provided during use as intended, after the additive building-up of the connecting body has finished, and the target properties of the connecting body, in particular of the functional structure of the connecting body, are present only after at least one further method step has been carried out. It is thus possible, for example, for a surface of the functional structure to be coated at least in certain portions, in particular completely. A coating of this type may, for example, increase or provide the media-tightness of the functional structure.

The functional structure may form part of a heat exchanger at least in certain portions, in particular completely. For example, a temperature-control medium is guided through or along the functional structure by means of a channel-like functional structure, wherein heat energy can be dissipated or taken up by thermal interaction with the connecting body and/or with at least one component body. For example, the functional structure makes it possible to form a cooling and/or heating circuit, which extends from at least its component body to the functional structure.

The functional structure may be designed, for example, to secure and/or to receive an attachment body in the manner of a flange. As an alternative or in addition, the functional structure may have a threaded portion and/or a structure, e.g., a receiving recess, corresponding to a connecting means (e.g., a rivet or a screw). In other words, the functional structure may form an interface for securing and/or for receiving an attachment body, wherein the interface serves to at least temporarily secure and/or to at least temporarily come into contact with a holder of an apparatus for building up the connecting body. This holder may form, for example, at least in certain portions, in particular completely, a constituent part of the vehicle structural component present in the final state and/or be removed from the vehicle structural component at least in certain portions, in particular completely, in the manner of a mounting aid and/or transport aid, in particular for the logistics of the vehicle structural component, prior to the use as intended of the vehicle structural component.

A cladding component and/or a functional component and/or a crash component may be included, for example, as attachment body that can be secured indirectly or directly to the at least one connecting body. It is also possible, for example, for the attachment body to be in the form of a holder, with the result that a further component, e.g., a hydraulic and/or pneumatic line and/or an electric line and/or other elements, can be secured or are secured detachably or non-detachably by means of the holder.

The functional structure of the at least one connecting body, for example, at least in the use state as intended of the vehicle structural component, may continue in a functional portion of the first and/or of the at least one further component body, and/or correspond to this functional portion. Preferably, the connecting-body-side functional structure and at least one component-body-side functional portion together form a portion or channel designed to guide a medium. In this respect, it is possible, for example, for the medium to be guided from the component-body-side functional portion to the connecting-body-side functional structure or be guided between them. In other words, the functional portion and the functional structure may be in the form of channel portions within which a medium can be transported from at least one component body to a connecting body and/or vice versa. It is also possible to optionally provide that a medium guided in or along a first functional portion of a first component body is guided or transported or can be transported via a first transition region to a connecting-body-side functional structure and from the connecting-body-side functional structure to a further functional portion of a further component body. In this respect, at least one component-body-side functional portion and a connecting-body-side functional structure connected thereto may form a channel structure for guiding a medium.

The connecting body may be built up, for example, by an additive production process using a powdered construction material and/or an additive production process using a liquid construction material. Preferably, the connecting body is built up by a build-up welding process, particularly preferably the connecting body is built up by a laser build-up welding process or by a plasma transferred arc build-up welding process. The build-up welding process or the laser build-up welding may also be referred to as "laser metal deposition (LMD)" or "direct metal deposition (DMD)" or as "cladding" or "laser cladding". In the process, a laser is used to melt metal powder, the building material not being present in a powder bed—as is present in other additive manufacturing processes (e.g., selective laser melting (SLM))—but rather the material, in particular in powdered form, is injected or introduced into the laser beam via a feed nozzle, in order there to fuse and solidify with material already present. In other words, on a component surface a laser is used to create a melt pool, into which metal powder is introduced by means of a nozzle in an automated way. This produces beads that are welded to one another and create built-up structures on existing basic bodies or on the component bodies.

The first and/or the further component body can be produced or have been produced, for example, in a non-additive production process, preferably in a casting process and/or in a machining process. This makes it possible to produce a vehicle structural component, in particular a body structural component, which forms a hybrid component, the portions of which have been produced at least in certain portions, in particular completely, using different manufacturing methods. It is thus possible that a first and/or a further component body was produced in a forming method and then is connected to a further component body in the course of the additive building-up of the connecting body. The further component body may in this respect have been produced, for example, in an additive or in a material removal and/or in a forming production process.

It is also possible to subject the assembly formed from the at least two component bodies and the connecting body to a further procedure after the component bodies have been connected to the connecting body. This further procedure may comprise forming and/or coating and/or thermally treating the assembly at least in certain portions.

Apart from the method for producing a vehicle structural component, in particular a body structural component of a vehicle, the invention also relates to an apparatus for producing a vehicle structural component, in particular a body structural component of a vehicle, in particular using a method described in the present document. This apparatus is characterized by a) a holding device for holding a first and at least one further component body and by b) a building-up device for additively building up at least one connecting body, wherein, during the additive building up of the connecting body at least in certain portions, in particular completely, the at least two component bodies are connected and/or can be connected by the connecting body to form the vehicle structural component, in particular the body structural component.

It is possible for the holding device to comprise a first holding means for holding the first component body and a further holding means for holding the at least one further component body. Preferably via the first holding means, the first component body can be moved independently of the at least one further component body held by the second holding means. The holding means may be designed, for example, in such a way that they can be displaced independently of one another. This makes it possible to change the relative position and/or alignment of at least one component body held by at least one holding means in relation to a further component body, in particular held by a further holding means. It is consequently possible, for example, to position and/or align a first component body and a further component body as desired within a space, in particular a construction chamber for additively building up the connecting body, in such a way that it becomes possible for building-up means of the additive building-up apparatus for producing the connecting body to be sufficiently able to reach locations that are to be provided as intended with the connecting body. In other words, a targeted relative movement between the first component and the at least one further component can be enabled in that the at least two holding means of the holding device that hold the respective components are correspondingly actuated or moved. It is optionally possible to arrange or form at least one third holding means, which at least temporarily allows the at least one connecting body to be held and/or supported at least in certain portions, in particular completely. The position and/or alignment of the individual holding means of the holding device can be moved or changed in an actuable way, for example, independently of one another.

The holding means of the holding device may be in the form, for example, of flexibly controllable fixing elements and/or a flexibly controllable receiving apparatus. In this way, the holding means may be incorporated, for example, in the form of lifting cylinders that can be deployed from the floor or in the form of robot arms, which can align and/or position the component bodies held thereby and/or at least one at least partially built-up connecting body freely in the three-dimensional construction space. This makes it possible to achieve, for example, reliable and defined alignment and/or positioning of the component bodies for additively building up the connecting body and/or for a subsequent step.

At least one component body, in particular all of the component bodies, and/or the at least one connecting body may be at least temporarily connected and/or connectable to the holding device, for example, by a force-fitting and/or form-fitting and/or materially bonded connection. Temporarily fixing the at least one component body and/or the at least one connecting body to the holding device makes it possible to prevent undesired mechanical loading of the assembly located in the structure during the production of the at least one connecting body. In particular in the case of the production of a connecting body which at least in certain portions is filigree and/or provided with a functional structure, it can prove to be advantageous to support or hold the connecting body, which is finished but in particular not yet in terms of its geometric shape, by means of the holding device in order to obtain its target geometry and/or in order to obtain the physical and/or chemical target properties of the assembly formed from at least two component bodies and the connecting body.

The holding device may comprise, for example, at least one holding means that can be deployed from a floor region and/or from a wall region of a construction space of the apparatus for additively building up the connecting body. Preferably, the at least one holding means is in the form of a holding means which is linearly movable, in particularly exclusively linearly movable. In an optional embodiment, at least one holding means, in particular all of the holding means, can be moved substantially along a line of action of gravity.

It is possible for the holding device to comprise a multiplicity of holding means, in particular uniformly arranged holding means, which can be moved in order to hold and/or support at least one component body, in particular at least two component bodies and/or the at least one connecting body, in particular can be moved or deployed from a floor and/or wall region of a construction space of an additive manufacturing apparatus for producing the connecting body. The holding means may be arranged or formed, for example, uniformly in a grid, with the result that, depending on the geometry of the first or further component body to be held and/or of the connecting body to be built up, it is selectively possible to move certain holding means independently of any other holding means into a holding position, in order to place the at least one component body in a defined position and/or alignment relative to a further component body and/or to a connecting body.

In an optional embodiment, it can be provided, for example, that the holding device moves at least one holding means during the additive building-up of the connecting body in such a way that a stress and/or compressive force acting on at least one component body and/or the connecting body while the connecting body is being built up is changed or can be changed. For example, it is possible to introduce a prestress, e.g., a torque, on at least one component body and/or on the connecting body, that has already been built up at the point in time at which the movement takes place, by actuating or by moving the holding means. Applying force to the vehicle structural component, in particular to the body structural component, during the additive building-up of the connecting body makes it possible to targetedly, in particular selectively and in a way dependent on the region, to influence the physical properties, in particular the component properties, of the vehicle structural component, in particular of the body structural component.

Apart from the method and the apparatus, the invention also relates to a vehicle structural component, in particular a body structural component, produced by or in a method described in the present document. The vehicle structural component may be characterized, for example, by a portion formed by a first component body and a second portion formed by a further component body and by a third portion formed by an additively built-up connecting body, wherein a functional structure of the vehicle structural component extends at least in certain portions, in particular completely, from the first portion to the third portion and/or from the second portion to the third portion. Preferably, the functional structure extends over the first, the second and the third portion, in particular uninterruptedly or continuously. In other words, the functional structure may be present in the three portions at least in certain portions and extend across at least one portion at least with the formation of a common or cohesive structure.

All of the advantages, details, embodiments and/or features of the method according to the invention can be transferred or applied to the apparatus according to the invention and to the vehicle structural component according to the invention.

The invention will be explained in more detail with reference to exemplary embodiments in the drawings.

DETAILED DESCRIPTION OF THE DRAWINGS

Figure 1:
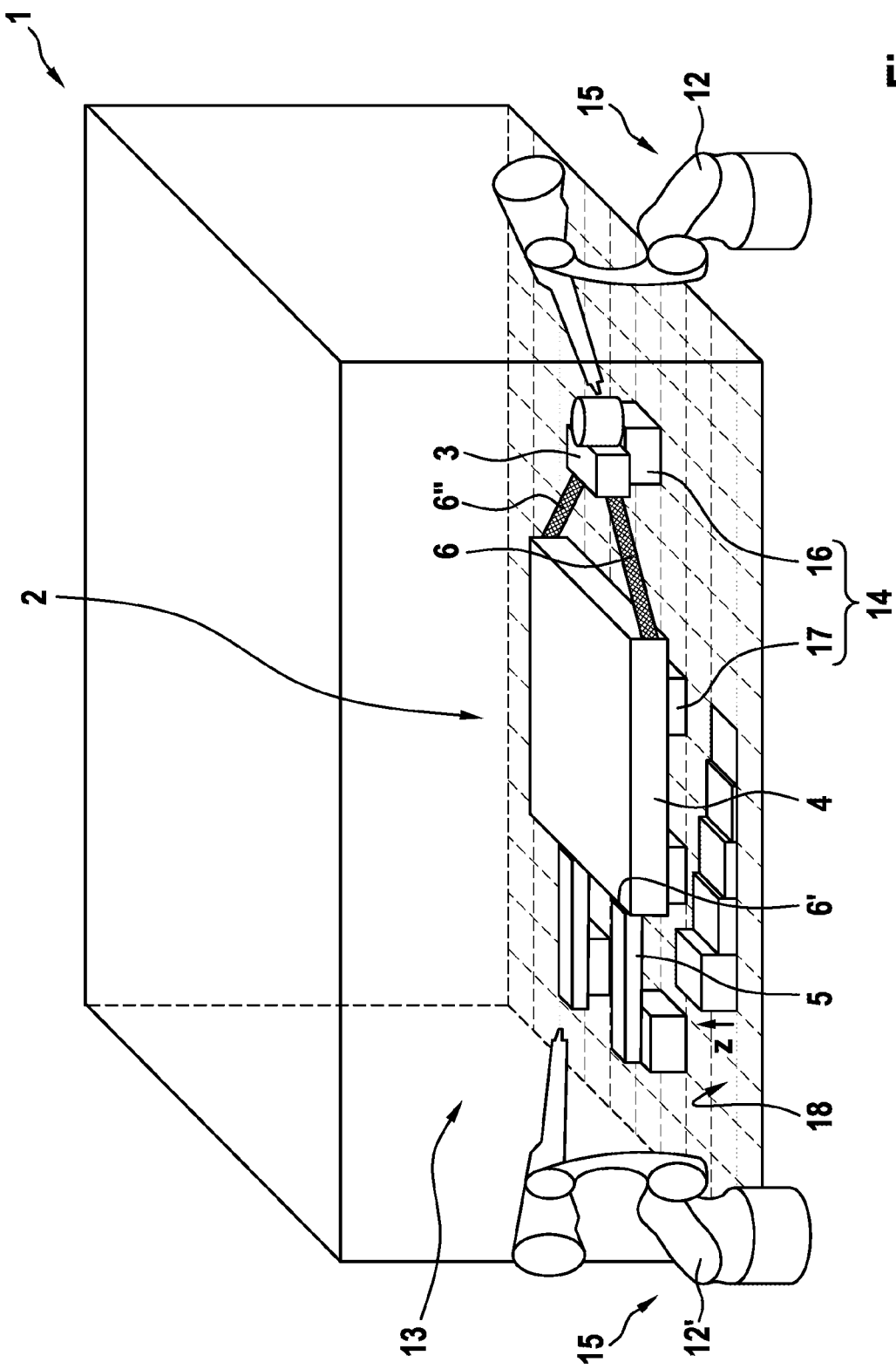
FIG. 1 shows a basic illustration of an apparatus for additively producing a connecting body and for connecting component bodies to connecting bodies according to one exemplary embodiment.

FIG. 1 illustrates an apparatus 1 for carrying out a method for producing a vehicle structural component 2, in particular a body structural component of a vehicle (not shown). The method comprises the following method steps: a) providing at least one first and at least one further component body 3, 4, 5, b) additively building up at least one connecting body 6, 6', 6", the at least two component bodies 3, 4, 5 being connected by the at least one connecting body 6, 6', 6" during the additive building-up of the at least one connecting body 6, 6', 6" at least in certain portions, in particular completely, to form the vehicle structural component 1, in particular the body structural component. Therefore, in the embodiment according to FIG. 1, the first component body 3 is connected to the further component body 4 via the connecting body 6 and via the further connecting body 6". In the final state, the vehicle structural component 2 shown in FIG. 1 comprises four component bodies 3, 4, 5, which are indirectly or directly connected respectively via connecting bodies 6, 6', 6".

The vehicle structural component 2, for example, at least in certain portions, in particular completely, may be in the form of at least one constituent part of a body, preferably in the form of a body structural component, and/or a chassis and/or a drive. For example, in FIG. 1 a first component body 3 forms a constituent part of a vehicle engine and a second component body 4 forms a constituent part of an electrical energy store and/or of a housing of an electrical energy store. Optionally, a third component body 5 may form a supporting structural element of a vehicle.

The vehicle structural component 2, in particular the body structural component, at least in certain portions, in particular completely, may be in the form of a bulkhead and/or a passenger compartment and/or a luggage compartment and/or a vehicle pillar, preferably an A-pillar and/or B-pillar and/or C-pillar and/or D-pillar.

Figure 2:
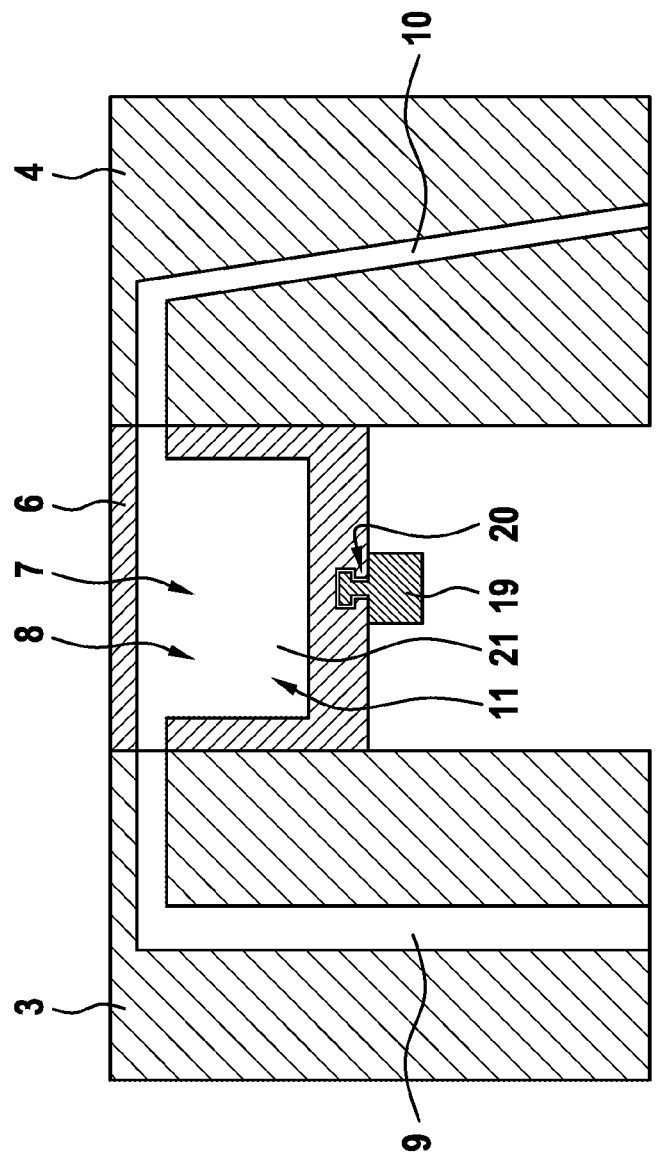
FIG. 2 shows a basic illustration of a vehicle structural component, in particular a body structural component, according to one exemplary embodiment.

A functional structure 7 may be arranged or have been arranged in or on the connecting body 6, 6', 6", for example. In FIG. 2, the functional structure 7 is in the form of a channel-like cavity of the connecting body 6, 6', 6" by way of example. The functional structure 7, at least in certain portions, in particular completely, may be built up or conjointly formed in the course of additively building up the at least one connecting body 6, 6', 6". As a result of the fact that the additive building-up enables a high degree of freedom in terms of the geometric configuration of the connecting body 6, 6', 6", it is possible, at least in certain portions, in particular completely, to conjointly build up the functional structure 7 in the course of the additive building-up by correspondingly actuating the additive manufacturing apparatus.

The functional structure 7, at least in certain portions, in particular completely, may be in the form of a portion 8 designed to guide an in particular liquid medium or in the form of a channel (cf. FIG. 2) and/or in the form of an interface 20 for securing and/or for receiving an attachment body 19. Preferably, the functional structure 7 and the in particular liquid medium that is guided or can be guided therein is used as heat exchanger. In FIG. 2, the portion 8 or the functional structure 7 of the connecting body 6 has a reservoir 18. In addition or as an alternative, the connecting body 6 may have an interface 20, via which an attachment body 19 can be secured by a form fit and/or force fit. According to FIG. 2, the attachment body 19 can be secured via a connecting-body-side interface 20 in the form of a recess; in this respect, the attachment body 19 has an engagement means corresponding to the recess.

As illustrated by way of example in FIG. 2, at least in the use state as intended of the vehicle structural component 2, the functional structure 7 of the connecting body 6, 6', 6" can continue in a functional portion 9, 10 of the first and/or of the at least one further component body 3, 4 and/or correspond to this functional portion 9, 10. Preferably, the connecting-body-side functional structure 7 and at least one component-body-side functional portion 9, 10 together form a portion designed to guide an in particular liquid or powdered medium. In FIG. 2, the functional portion 9 within the first component body 3 is in the form of a canal which extends there and continues in a functional structure 7, in the form of a channel portion, of the connecting body 6. Within the volume of main extent of the connecting body 6, the functional portion 7 has a region 11 of increased volume, which may be used, for example, as a reservoir 18 and/or as a retaining region for an in particular liquid or powdered medium that is guided or can be guided within the channel-like functional structure 7. Downstream of the region 11 of increased volume, the channel tapers toward the second component body 4 in such a way that a corresponding or stepless transition of the medium is produced in the region of the transition of the connecting body 6 to the functional portion 10 of the second component body 4.

The connecting body 6, 6', 6" may be built up, for example, by an additive production process using a powdered construction material and/or by an additive production process using a liquid construction material. Preferably, the connecting body 6, 6', 6" can be built up by a build-up welding process, particularly preferably by a laser build-up welding process or by a plasma transferred arc build-up welding process. For example, the robot devices 12, 12' illustrated in FIG. 1 may be formed in such a way that they can carry out a laser build-up welding process within the construction space 13 of the apparatus 1.

The first and/or the at least one further component body 3, 4, 5 may be produced or have been produced, for example, in a non-additive production process, preferably in a casting process and/or in a machining process. As an alternative, the first and/or the at least one further component body 3, 4, 5 may have been built up at least in certain portions, in particular completely, in an additive production process different from the additive production process of the connecting body.

The apparatus 1 for producing a vehicle structural component 2, in particular a body structural component of a vehicle, may, for example, in particular using a method according to one of the preceding claims, be characterized by a) a holding device 14 for holding a first and at least one further component body 3, 4, 5, b) a building-up device 15 for additively building up at least one connecting body 6, 6', 6", wherein, during the additive building up of the at least one connecting body 6, 6', 6" at least in certain portions, in particular completely, the at least two component bodies 3, 4, 5 are connected and/or can be connected by the at least one connecting body 6, 6', 6" to form the vehicle structural component 2, in particular the body structural component. The building-up device 15 may comprise, for example, at least one robot device 12, 12', in particular a multiplicity of robot devices, which make it possible to build up a connecting body 6, 6', 6" within a construction space 13.

The holding device 14 may comprise, for example, a first holding means 16 for holding the first component body 3, and a further holding means 17 for holding the at least one further component body 4. Preferably via the first holding means 16, the first component body 3 can be moved, in particular positioned and/or aligned, independently of the at least one further component body 4, 5 held by the second holding means 17.

At least one component body 3, 4, 5, in particular all of the component bodies 3, 4, 5, and/or at least one connecting body 6, 6', 6" may be at least temporarily connected and/or connectable to the holding device 14, in particular to at least one holding means 16, 17, by a force-fitting and/or form-fitting and/or materially bonded connection. As an alternative or in addition, the at least one component body 3, 4, 5 and/or the at least one connecting means 6, 6', 6" may rest on the holding means 16, 17, that is to say, for example, that the component body 3, 4, 5 and/or the at least one connecting means 6, 6', 6" rests on the holding means 16, 17 by virtue of its own weight and therefore as a result of gravity, preferably in a statically specific or stationary way.

The holding device 14 may comprise, for example, at least one holding means 16, 17 which can be deployed from a floor region 18 and/or from a wall region of a construction space 13 of the apparatus 1 for additively building up the connecting body 6, 6', 6". Preferably, the at least one holding means 16, 17 is in the form of a linearly movable holding means 16, 17, in particular an exclusively linearly movable holding means. As illustrated in FIG. 1, the holding device 14 may comprise, for example, a multiplicity of in particular uniformly arranged holding means 16, 17 that can be deployed linearly out of the floor region 18 of the construction space 13 of the apparatus 1 for additively building up the connecting body 6, 6', 6". The holding means 16, 17 serve to hold and/or support at least one component body 3, 4, 5 and/or the at least one connecting body 6, 6', 6". In FIG. 1, for the purpose of illustration and by way of example, a row of holding means 16, 17 that are next to one another and are moved out of the floor region 18 at different heights in the Z direction are shown in front of the vehicle structural component 2.

Apart from the method and the apparatus 1, the invention relates to a vehicle structural component 2, in particular a body structural component, produced in a method described in the present document. For example, the vehicle structural component 2 may comprise a first portion formed by a first component body 3 and a second portion formed by a further component body 4, 5 and a third portion formed by an additively built-up connecting body 6, 6', 6", wherein a functional structure 7 extends at least in certain portions, in particular completely, from the first portion to the third portion and/or from the second portion to the third portion, the functional structure 7 preferably extends in particular without interruption across the first, the second and the third portion. According to FIG. 2, the functional structure 7 extending over the three portions is formed by the functional structure 7 of the connecting body 6, 6', 6" and the adjoining functional portions 9, 10 of the first and the further component body 3, 4.

LIST OF REFERENCE CHARACTERS

1 Apparatus
2 Vehicle structural component
3 First component body
4 Second component body
5 Third component body
6, 6', 6" Connecting body
7 Functional structure
8 Portion of 7
9 Functional portion of 3
10 Functional portion of 4
11 Region of 7
12, 12' Robot device
13 Construction space of 1
14 Holding device
15 Building-up device
16 First holding means
17 Further holding means
18 Floor region
19 Attachment body
20 Interface
21 Reservoir

The invention claimed is:

1. A method for producing a vehicle structural component, comprising the steps of:
   providing a first component body and a second component body;
   forming a connecting body in a course of an additive production process; and
   connecting the first component body and the second component body during the course of the additive production process when forming the connecting body to form the vehicle structural component;
   wherein a functional structure is formed in or on the connecting body and wherein the functional structure at least in a portion is built up in the course of the additive production process.

2. The method according to claim 1, wherein the vehicle structural component at least in a portion is in a form of a body structural component or a chassis or a drive.

3. The method according to claim 1, wherein the vehicle structural component at least in a portion is in a form of a bulkhead or a passenger compartment or a luggage compartment or a vehicle pillar.

4. The method according to claim 1, wherein the functional structure is in a form of a portion configured to guide a medium or an interface for securing or for receiving an attachment body.

5. The method according to claim 1, wherein the functional structure at least in a use state of the vehicle structural component continues in a functional portion of the first component body or the second component body or corresponds to the functional portion of the first component body or the second component body and wherein the functional structure and the first component body or the second component body together form a portion designed to guide a medium.

6. The method according to claim 1, wherein the additive production process uses a powdered construction material or a liquid construction material.

7. The method according to claim 1, wherein the additive production process is a laser build-up welding process or a plasma transferred arc build-up welding process.

8. The method according to claim 1, wherein the first component body or the second component body is produced in a non-additive production process and wherein the non-additive production process is a casting process or a machining process.

9. A vehicle structural component produced by a method that comprises:
   providing a first component body and a second component body;
   forming a connecting body in a course of an additive production process; and
   connecting the first component body and the second component body during the course of the additive production process when forming the connecting body to form the vehicle structural component;
   wherein a first portion is formed by the first component body, a second portion is formed by the second component body, and a third portion is formed by the connecting body and wherein a functional structure extends at least in a portion from the first portion to the third portion or from the second portion to the third portion.

10. The vehicle structural component according to claim 9, wherein the vehicle structural component is a body structural component.

11. A vehicle structural component produced by a method that comprises:
    providing a first component body and a second component body;
    forming a connecting body in a course of an additive production process; and
    connecting the first component body and the second component body during the course of the additive production process when forming the connecting body to form the vehicle structural component;
    wherein a first portion is formed by the first component body, a second portion is formed by the second component body, and a third portion is formed by the connecting body and wherein a functional structure extends without interruption across the first portion, the second portion, and the third portion.

12. The vehicle structural component according to claim 11, wherein the vehicle structural component is a body structural component.

* * * * *